United States Patent
Lee et al.

(10) Patent No.: US 8,313,700 B2
(45) Date of Patent: Nov. 20, 2012

(54) FIXED AND FLUIDIZED BED WATER GAS SHIFT REACTOR USING SYNGAS FROM WASTE GASIFICATION AND HYDROGEN PRODUCTION METHOD USING THE SAME

(75) Inventors: See Hoon Lee, Daejeon (KR); Jae Ho Kim, Daejeon (KR); Jae Goo Lee, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 540 days.

(21) Appl. No.: 12/511,933

(22) Filed: Jul. 29, 2009

(65) Prior Publication Data
US 2011/0027170 A1    Feb. 3, 2011

(51) Int. Cl.
*B01J 8/02* (2006.01)
*B01J 8/04* (2006.01)
*B01J 8/24* (2006.01)
*B01J 8/28* (2006.01)

(52) U.S. Cl. ........ 422/108; 422/109; 422/111; 422/139; 422/142; 422/146; 422/211; 422/631; 422/207; 423/247; 423/655

(58) Field of Classification Search .......... 422/105, 422/108–111, 626, 631, 141, 142, 146, 139, 422/211, 207, 647; 423/247, 655
See application file for complete search history.

(56) References Cited

U.S. PATENT DOCUMENTS

| | | | | |
|---|---|---|---|---|
| 3,010,807 A | * | 11/1961 | Christensen et al. | 422/626 |
| 3,355,249 A | * | 11/1967 | Squires | 423/656 |
| 3,666,682 A | * | 5/1972 | Muenger | 252/373 |
| 2005/0164046 A1 | * | 7/2005 | Fujihara et al. | 429/12 |
| 2011/0033373 A1 | * | 2/2011 | Lee et al. | 423/658.3 |
| 2011/0081291 A1 | * | 4/2011 | Baek et al. | 423/656 |
| 2011/0286901 A1 | * | 11/2011 | Lee et al. | 423/230 |

FOREIGN PATENT DOCUMENTS
JP    56044044 A    *    4/1981

* cited by examiner

*Primary Examiner* — Jennifer A Leung
(74) *Attorney, Agent, or Firm* — Kile Park Goekjian Reed & McManus PLLC (57) ABSTRACT

The water gas shift reactor includes a gas reaction tank including a reaction chamber formed in the shape of a hollow body provided with a porous plate installed therein to divide the inside of the reaction chamber into an upper reaction space and a lower collection space and a catalyst stacked on the upper surface of the porous plate to convert carbon monoxide into hydrogen, and an insulating layer provided at the outer surface of the reaction chamber, a syngas storage tank to store the syngas, a syngas supply pipe to supply the syngas to the gas reaction tank, after the syngas is heated by a preheater, a steam supply pipe to supply steam generated from a steam generator to the gas reaction tank such that the steam reacts with the syngas, after the steam is heated by a preheater, and a reaction gas discharge pipe.

9 Claims, 11 Drawing Sheets

FIXED AND FLUIDIZED BED WATER GAS SHIFT REACTOR USING SYNGAS FROM WASTE GASIFICATION AND HYDROGEN PRODUCTION METHOD USING THE SAME

BACKGROUND OF THE INVENTION

1. Field of the Invention

The present invention relates to a fixed and fluidized bed water gas shift reactor using syngas from waste gasification and a hydrogen production method using the same, and more particularly to an apparatus and a method using the same, which produce hydrogen by a reaction of carbon monoxide in the syngas, obtained by gasifying combustible waste, such as residues of scrapped cars, plastic waste, and living waste, through partial oxidation or thermal decomposition at a temperature of 1,300~1,700° C., with water to increase the proportion of hydrogen in the syngas. That is, the syngas containing hydrogen, carbon monoxide, carbon dioxide, hydrogen sulfide, and hydrogen monoxide generated from gasification of combustible waste contains carbon monoxide at a concentration of 30~50%. The syngas and steam are supplied upward from the lower part of a gas reaction tank to fluidize a catalyst, or are supplied downward from the upper part of the gas reaction tank to convert carbon monoxide into hydrogen on the catalyst, thereby increasing a hydrogen production rate.

2. Description of the Related Art

In order to simultaneously solve environmental and energy problems due to global warming and resource exhaustion, use of renewable energy has been increasingly expanded.

Further, various trials to produce energy from waste, which is generated every day, other than energy sources obtained from nature, such as the force of the wind and the force of the sun, have been made.

Among methods to dispose of waste, which have been devised so far, land reclamation is gradually reduced due to lack of reclaimed lands and increase of environmental pollution, and incineration to dispose of waste by burning is not widely used due to the purpose of only reducing the weight of waste and worries about the environment.

Therefore, a gasification process or a gasification and melting process to convert waste into syngas containing hydrogen and carbon monoxide has been developed. The gasification process of the waste is capable of producing hydrogen, which is a representative clean fuel, but produces syngas containing carbon monoxide at a concentration of 30~50% of the total amount of the syngas. For this reason, simple heat and electricity production through an industrial furnace, a boiler, etc. is used as a general energy production method.

Accordingly, in order to achieve use of clean energy resources, such as use of fuel cells and production of alternative fuel, conversion of carbon monoxide of a high concentration into hydrogen is required.

Generally, in order to convert carbon monoxide into hydrogen, a fixed bed water gas shift reactor, which is used in a natural gas reforming process, is employed. However, the above reactor has a low conversion rate, and thus application thereof to conversion of carbon monoxide at a high concentration of 30~50% into hydrogen is difficult.

For example, Korean Patent Registration No. 0462286 discloses a water gas shift catalyst with ceramic on metal morphology and a method for manufacturing the same, in which ceramic is supported on metal, differing from a conventional method in which metal is supported on ceramic, to increase catalytic activity and thermal stability. However, although the above method improves catalytic activity, compared with the conventional method, the above method is suited to conversion of CO gas of a small amount and thus is not suited to conversion CO gas of a high concentration, which is the subject matter of the present invention.

Further, Korean Patent Registration No. 0834298 discloses a process of converting carbon monoxide into hydrogen by injecting steam into water gas during disposal of waste. However, the above process is used as a preliminary process of burning hydrogen rather than collecting hydrogen.

Therefore, researches into a hydrogen production system and method, in which water gas containing carbon monoxide at a high concentration is reformed to increase a hydrogen production rate, have been required.

SUMMARY OF THE INVENTION

Therefore, the present invention has been made in view of the above problems, and it is an object of the present invention to provide a fixed and fluidized bed water gas shift reactor using syngas from waste gasification and a hydrogen production method using the same, in which hydrogen is produced by a reaction of carbon monoxide in the syngas, obtained by gasifying combustible waste through partial oxidation or thermal decomposition at a temperature of 1,300~1,700° C., with water in order to increase the proportion of hydrogen in the syngas.

It is another object of the present invention to provide a fixed and fluidized bed water gas shift reactor using syngas from waste gasification and a hydrogen production method using the same, in which a steam injection pipe to supply steam of a low temperature is further provided on a gas reaction tank to control supply of the steam according to a sensed temperature of the gas reaction tank and thus to control a reaction temperature in the gas reaction tank.

In accordance with one aspect of the present invention, the above and other objects can be accomplished by the provision of a fixed and fluidized bed water gas shift reactor using syngas, which converts carbon monoxide in the syngas, generated from gasification of combustible waste, into hydrogen, including a gas reaction tank including a reaction chamber formed in the shape of a hollow body provided with a porous plate installed in a lower portion thereof to divide the inside of the reaction chamber into an upper reaction space and a lower collection space and a catalyst stacked on the upper surface of the porous plate to convert carbon monoxide into hydrogen, and an insulating layer provided at the outer surface of the reaction chamber to prevent heat in the reaction chamber from being discharged to the outside of the reaction chamber, a syngas storage tank to store the syngas obtained by the gasification of the combustible waste, a syngas supply pipe to supply the syngas to the gas reaction tank, after the syngas from the syngas storage tank is heated by a preheater, a steam supply pipe to supply steam generated from a steam generator to the gas reaction tank such that the steam reacts with the syngas, after the steam is heated by a preheater, and a reaction gas discharge pipe installed opposite to the syngas supply pipe to discharge reaction gas obtained by a reforming reaction in the gas reaction tank.

In accordance with another aspect of the present invention, there is provided a hydrogen production method using a fixed and fluidized bed water gas shift reactor using syngas with a gas reaction tank, which receives syngas and steam to convert carbon monoxide in the syngas, produced from gasification of combustible waste, into hydrogen, and is provided with a catalyst on a porous plate installed in a reaction chamber and an insulating layer formed at the outside of the reaction chamber to prevent heat loss, including supplying syngas, containing carbon monoxide at a high concentration, heated by a preheater, mixing steam, heated by a preheater, with the supplied syngas, reforming the mixture of the syngas and the steam with the catalyst to increase the proportion of hydrogen, and collecting reaction gas produced by the reformation.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, a fixed and fluidized bed water gas shift reactor using syngas from waste gasification and a hydrogen production method using the same in accordance with the present invention will be described in detail with reference to the annexed drawings.

Figure 1A:
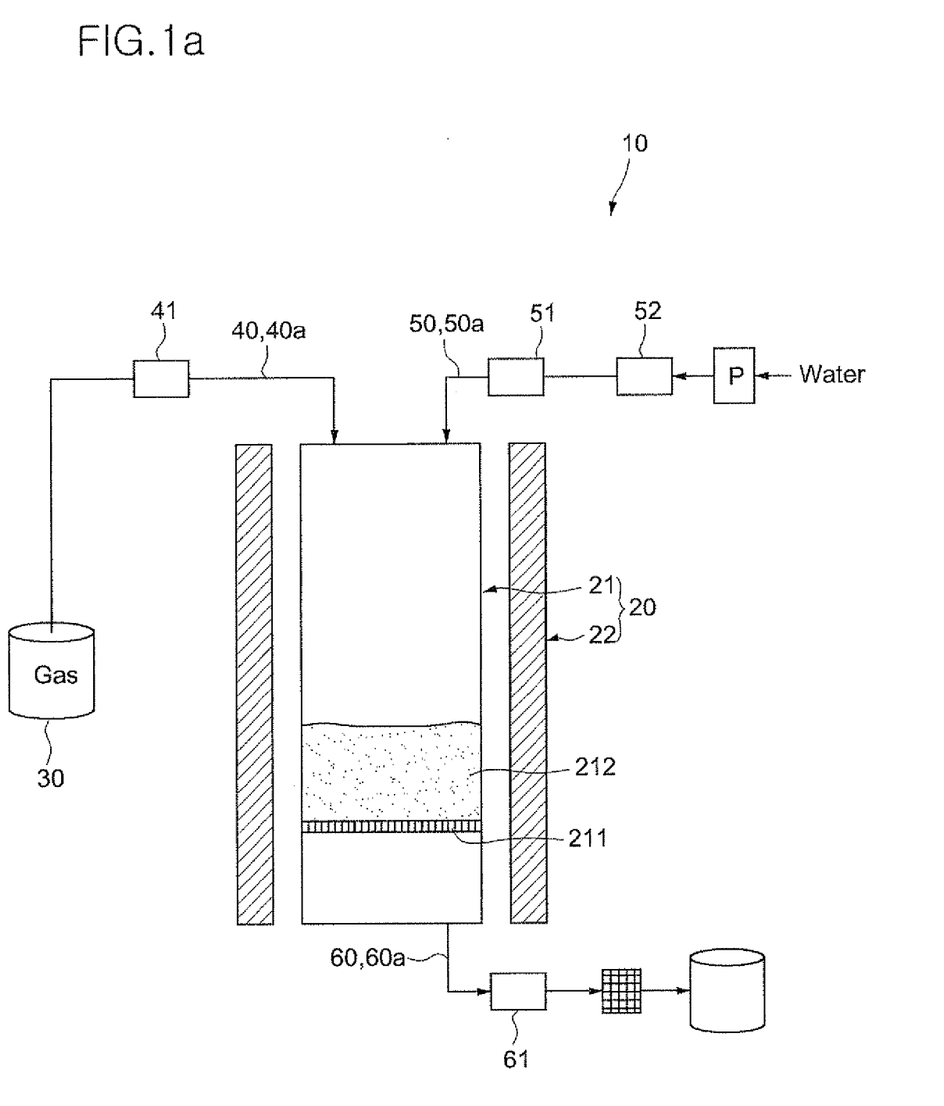
FIG. 1a is a schematic view illustrating a water gas shift reactor in accordance with one embodiment of the present invention.
Figure 3:
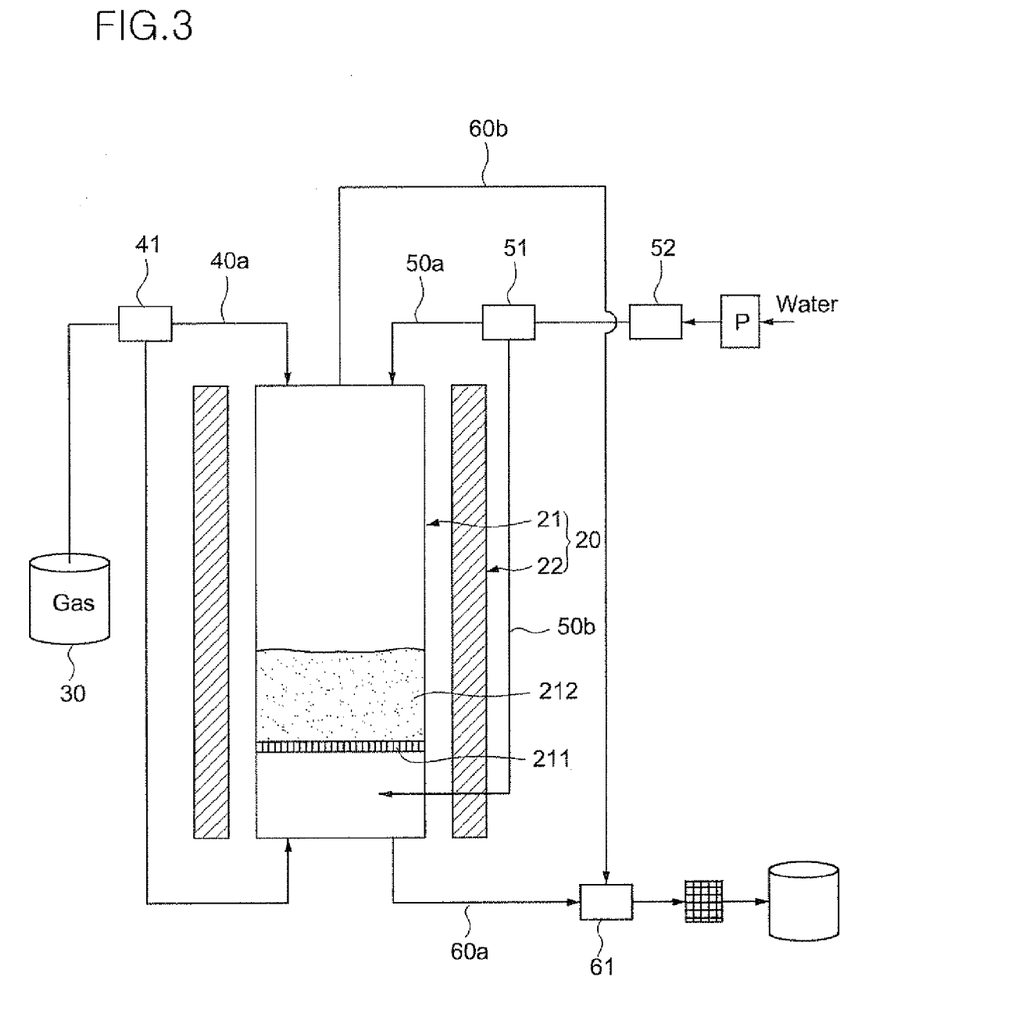
FIG. 3 is a schematic view illustrating a water gas shift reactor in accordance with a further embodiment of the present invention.

A water gas shift reactor 10 in accordance with the present invention, as shown in FIGS. 1a and 3, includes a gas reaction tank 20, a syngas storage tank 30 to store syngas supplied to the gas reaction tank 20, a syngas supply pipe 40 to supply the syngas to the gas reaction tank 20, a steam supply pipe 50 to supply steam to the gas reaction tank 20, and a reaction gas discharge pipe 60 to discharge reaction gas obtained by a reforming reaction in the gas reaction tank 20.

The gas reaction tank 20 includes a reaction chamber 21 formed in the shape of a hollow body provided with a porous plate 211 installed in a tower portion thereof to divide the inside of the reaction chamber 21 into an upper reaction space and a lower collection space and a catalyst 212 stacked on the upper surface of the porous plate 211 to convert carbon monoxide into hydrogen, and an insulating layer 22 provided at the outer surface of the reaction chamber 21 to prevent heat in the reaction chamber 21 from being discharged to the outside of the reaction chamber 21. The stacked catalyst 212 is a mixture obtained by mixing 2~6 wt % cobalt (Co), 5~20 wt % Molybdenum (Mo), and the remainder of silica alumina ($SiO_2$—$Al_2O_3$) serving as a base material.

The syngas storage tank 30 stores syngas obtained by gasifying combustible waste, and the syngas has a composition ratio of about 40% $H_2$, 40% CO, 18% $CO_2$, and 2% $CH_4$ according to the measurement by a test.

The syngas having the above composition ratio is supplied to the gas reaction tank 20 through the syngas supply pipe 40, and is heated to a high temperature by a preheater 41 installed on a flow channel to easily achieve a syngas reforming reaction.

Further, steam, which is a component required in the reforming reaction, is supplied from the steam supply pipe 50. Here, steam generated from a steam generator 52 is heated by a preheater 51, and the steam of a high temperature is supplied to the gas reaction tank 20.

Thereafter, reaction gas obtained by the reformation in the gas reaction tank 20 is discharged to the outside of the gas reaction tank 20 through the reaction gas discharge pipe 60 installed opposite to the syngas supply pipe 40. After steam is removed from the discharged reaction gas through a steam collector 61, the reaction gas is purified by filtering, and then is stored.

In the water gas shift reactor having the above structure in accordance with the present invention, a syngas supply position may be diversified.

For example, with reference to FIG. 1a, the syngas supply pipe 40a is connected to the upper part of the gas reaction tank 20 such that the syngas is supplied downward from the upper part of the gas reaction tank 20. Preferably, a steam supply pipe 50a is also connected to the upper part of the gas reaction tank 20 so as not to obstruct the downward flow of the syngas. During the above fluid flow process, the syngas and the steam are mixed with each other, and reformation of the mixture by the catalyst 212 stacked on the upper surface of the porous plate 211 is achieved, thus producing hydrogen. The produced hydrogen is discharged through a reaction gas discharge pipe 60a connected to the lower part of the gas reaction tank 20. If the syngas and the steam flow downward, the catalyst 213 forms a fixed bed without fluidization.

Figure 1B:
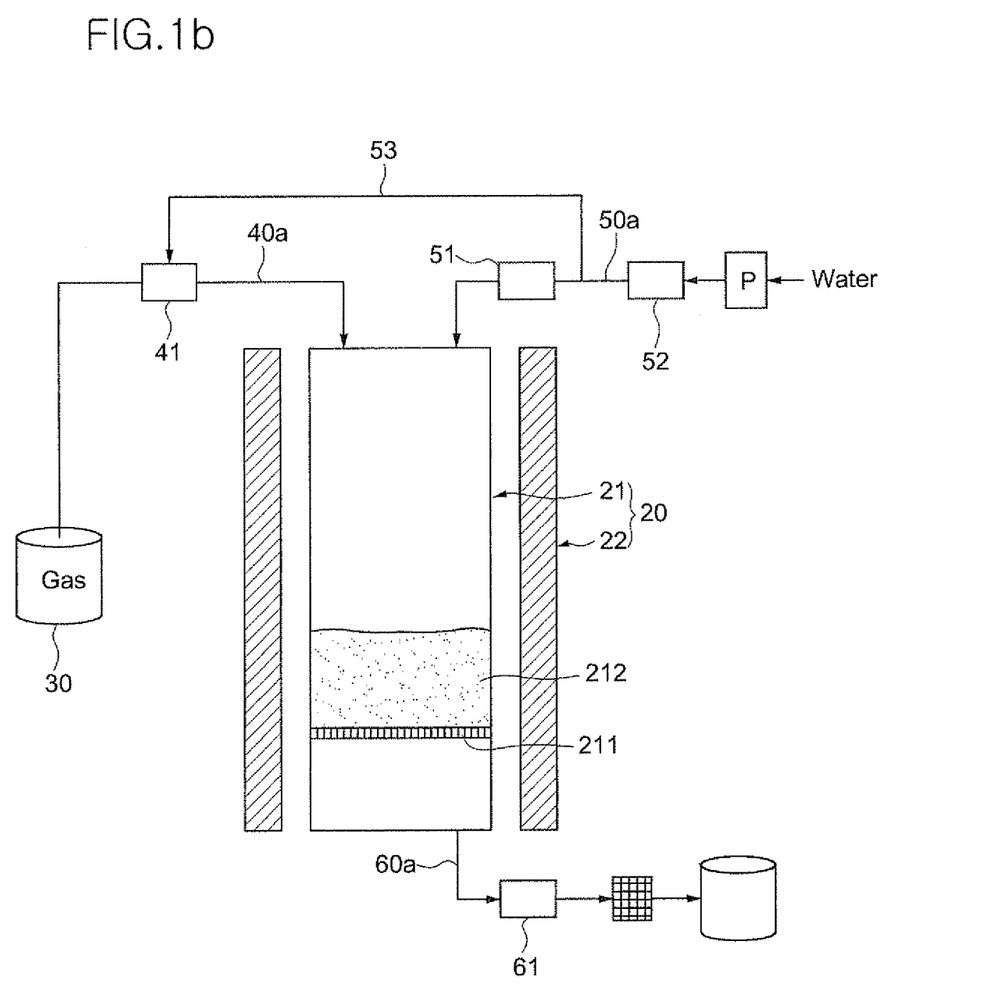
FIG. 1b is a schematic view illustrating the water gas shift reactor in accordance with the embodiment of the present invention in a state in which a steam mixing pipe is further provided on the water gas shift reactor.

The steam to be supplied to the gas reaction tank 20 may be supplied directly to the gas reaction tank 20 through the preheater 51 connected to the steam supply pipe 50a, as shown in FIG. 1a. Further, the steam generated from the steam generator 52 may be supplied to the preheater 41 connected to the syngas supply pipe 40a through a steam mixing pipe 53 branched off from the steam supply pipe 50a such that the steam is mixed with the syngas and then the mixture is supplied to the gas reaction tank 20, as shown in FIG. 1b. In this case, a time to mix the syngas and the steam is elongated, and thus a reforming reaction is more easily achieved.

Figure 2:
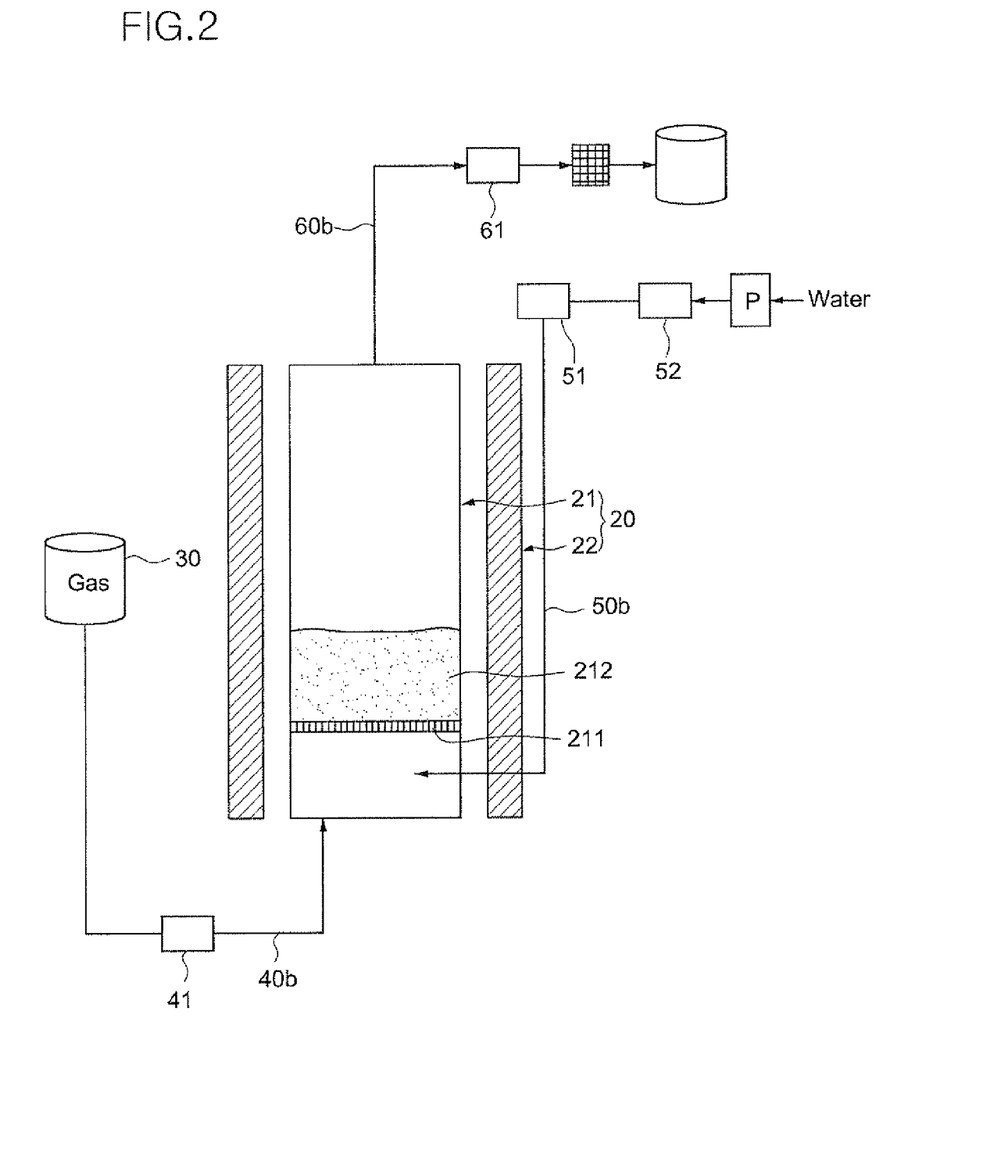
FIG. 2 is a schematic view illustrating a water gas shift reactor in accordance with another embodiment of the present invention.

Moreover, with reference to FIG. 2, a syngas supply pipe 40b and a steam supply pipe 50b may be connected to the lower collection space of the gas reaction tank 20 such that syngas and steam flow upward, and a reaction gas discharge pipe 60b to discharge reaction gas may be connected to the upper part of the gas reaction tank 20.

In the above structure, the catalyst 212 is fluidized in the upper reaction space above the porous plate 211 by supply pressures of the syngas and the steam. During such fluidization, particles of the catalyst 212 frequently collide with each other and thus the outer surface of the catalyst 212 is worn or damaged. That is, the damage to the outer surface of the catalyst 212 due to the above process serves to prevent lowering of reforming efficiency due to absorption of carbon during the reforming process.

With reference to FIG. 3, syngas supply pipes 40a and 40b to supply syngas, steam supply pipes 50a and 50b to supply steam, and reaction gas discharge pipes 60a and 60b to collect and discharge reaction gas are respectively connected to the upper and lower parts of the gas reaction tank 20 to selectively achieve upward supply and downward supply of the syngas and the steam, thereby selectively carrying out a reforming reaction on a fixed bed and a fluidized bed. FIG. 3 illustrates that preheaters 41 and 51 respectively connected to the syngas supply pipes 40a and 40b and the steam supply pipes 50a and 50b determine syngas and steam supply directions. More particularly, the syngas and steam supply directions are determined by manipulation of valves installed at branch points, where the respective pipes are branched.

Figure 4:
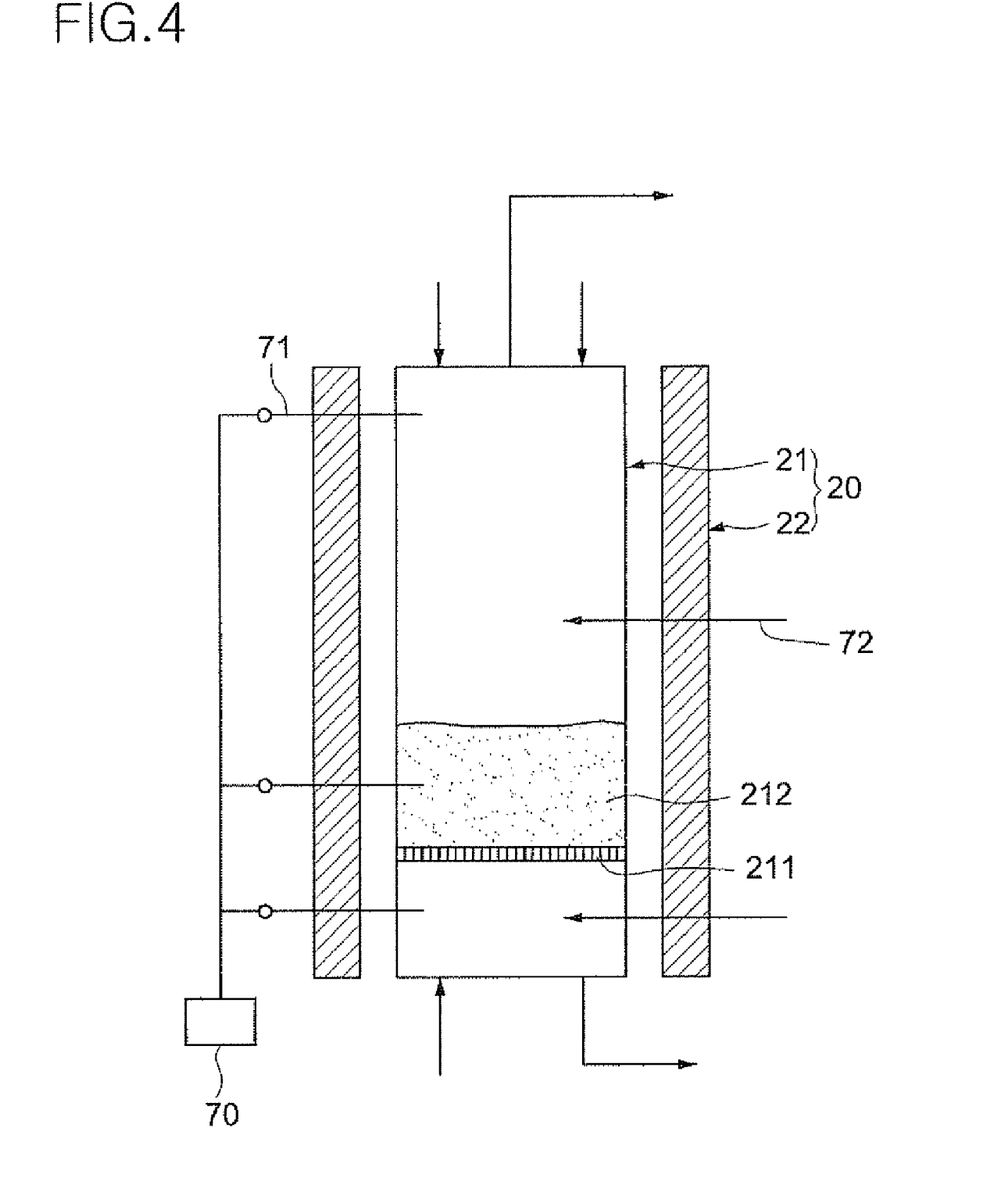
FIG. 4 is a schematic sectional view illustrating a gas reaction tank provided with temperature measuring units and an air injection pipe in accordance with the present invention.

With reference to FIG. 4, a temperature measuring unit 71 is connected to each of the upper reaction space, the catalyst stack space, and the lower collection space of the gas reaction tank 20, and a steam injection pipe 72 is connected to the side surface of the upper reaction space.

The respective temperature measuring units 71 are connected to a controller 70, and measure temperatures of the respective spaces of the gas reaction tank 20. That is, since the reforming reaction of the present invention is an exothermic reaction, when overheating occurs during the reforming reaction, reformation is not smoothly achieved. Accordingly, steam of a low temperature is additionally supplied to the gas reaction tank 20 through the steam injection pipe 72, and thus reduces the temperature of the gas reaction tank 20, particularly, the part of the gas reaction tank 20, where the catalyst 212 is stacked or fluidized, thereby allowing the reforming reaction to be easily achieved.

Figure 5:
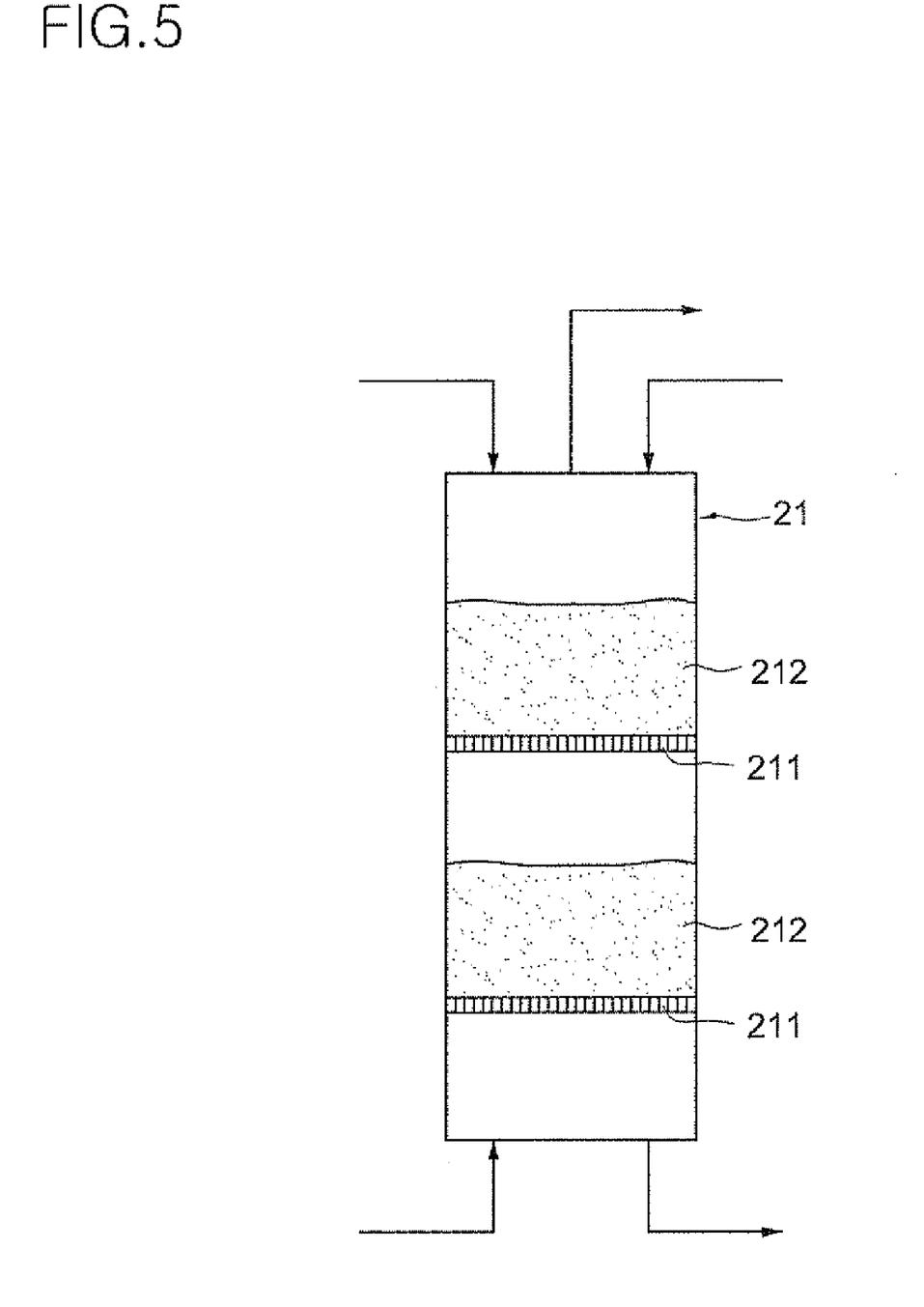
FIG. 5 is a schematic sectional view illustrating a reaction chamber provided with porous plates disposed in a two-stage structure in accordance with the present invention.

With reference to FIG. 5, the gas reaction tank 20 of the present invention may include porous plates 211 disposed in a two-stage structure such that a reforming reaction is achieved in multiple stages. Since the above two-stage structure includes catalyst layers formed in two stages, a contact area between the syngas and the steam and the catalyst 212 is increased, and thus the conversion rate of carbon monoxide into hydrogen is increased. Further, the inside of the gas reaction tank 20 reaches a higher temperature than the temperature caused by the exothermic reaction, thereby promoting the reforming reaction.

Preferably, a mixing space is formed above the catalyst layer, obtained by stacking the catalyst 212 on the porous plate 211, such that the catalyst 212 is fluidized in the mixing space or the syngas and the steam is easily mixed in the mixing space, and the porous plate 211 is provided with a plurality of through holes having a smaller diameter than the diameter of particles of the catalyst 212 such that gas flows vertically via the through holes, and is made of stainless in the same manner as the overall equipment so as to prevent corrosion.

Figure 6:
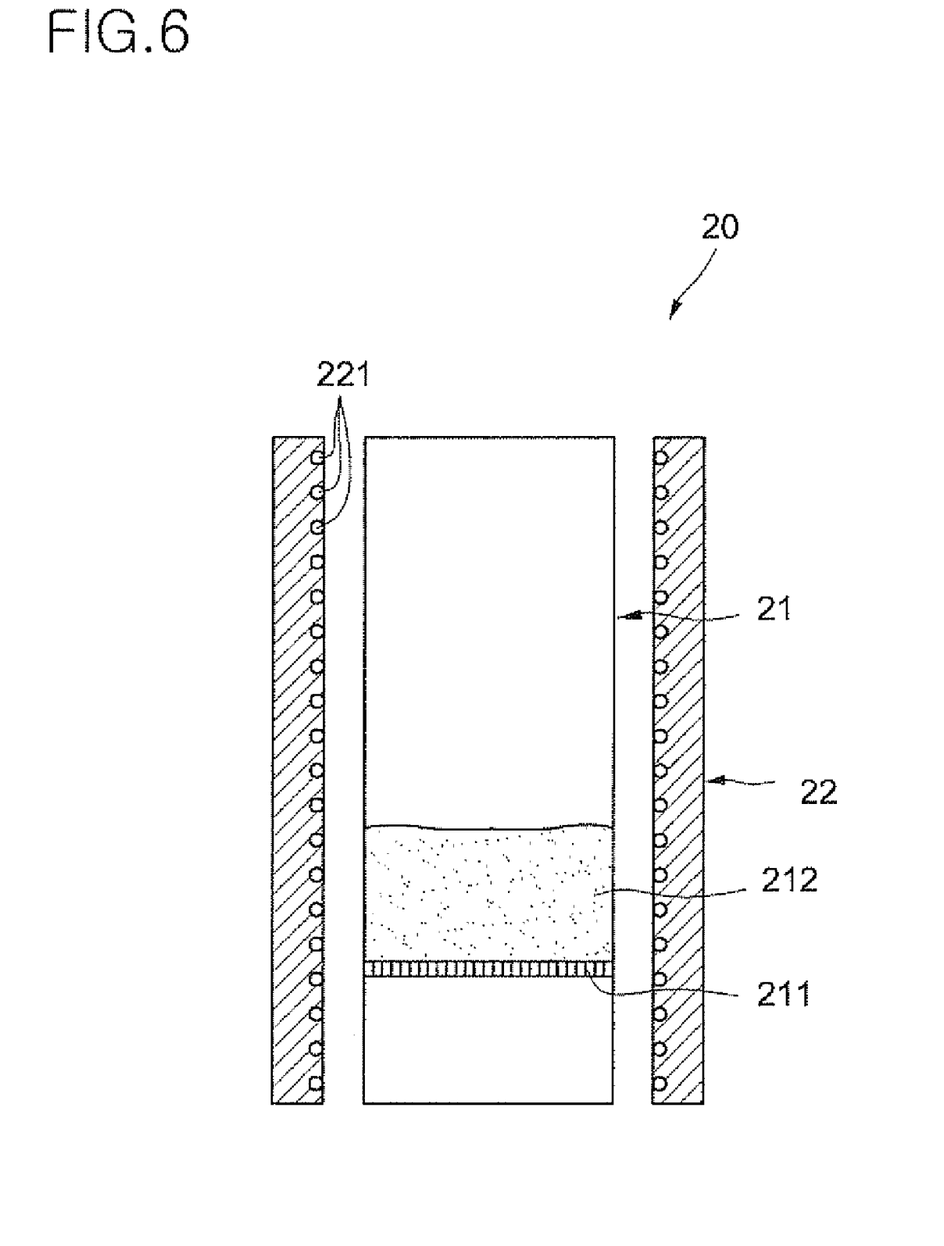
FIG. 6 is a schematic sectional view of a gas reaction tank provided with heaters in accordance with the present invention.

With reference to FIG. 6, heaters 221 are provided in the insulating layer 22 of the gas reaction tank 20, thus allowing the reaction chamber 21 located at the inside of the insulating layer 22 to maintain a high temperature.//

That is, when the water gas shift reactor 10 is started, the temperature of the reaction chamber 21 is low, and thus the temperatures of the injected syngas and steam are lowered and the reforming reaction is not smoothly achieved. Therefore, in the initial starting stage of the water gas shift reactor 10, the reaction chamber 21 is preheated in advance to a designated temperature or more by the heaters 221.

Now, a hydrogen production method using a fixed and fluidized bed water gas shift reactor using syngas in accordance with the present invention will be described.

Figure 7A:
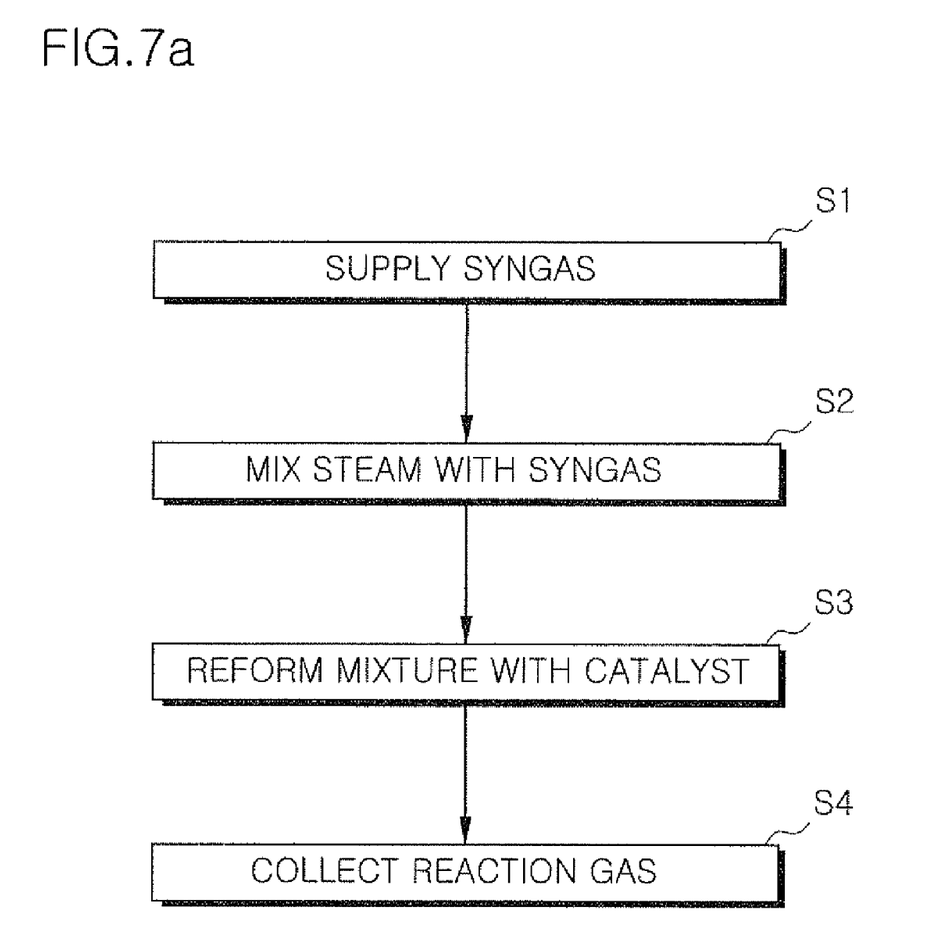
FIGS. 7a and 7b are block diagrams illustrating a hydrogen production method in accordance with the present invention.
Figure 7B:
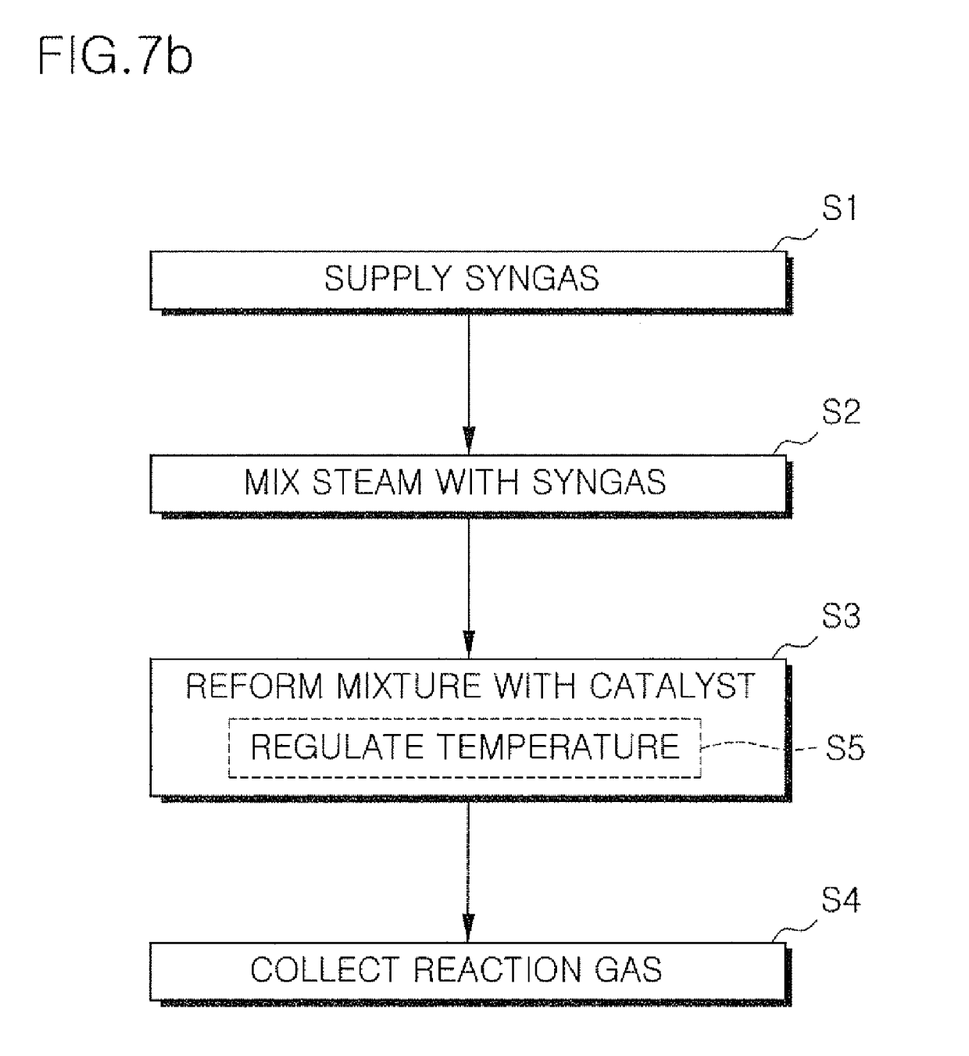

With reference to FIGS. 7a and 7b, the hydrogen production method using the water gas shift reactor with a gas reaction tank, which receives syngas and steam to convert the syngas, produced from a gasification process of combustible waste, into hydrogen, and is provided with a catalyst stacked on a porous plate installed in a reaction chamber and an insulating layer formed at the outside of the reaction chamber, includes supplying the syngas, containing carbon monoxide at a high concentration, heated by a preheater (S1), mixing steam heated by another preheater with the supplied syngas (S2), reforming the mixture of the syngas and the steam with the catalyst to increase the proportion of hydrogen (S3), and collecting reaction gas produced by the reformation (S4).

The hydrogen production method further includes regulating a reforming temperature to be in the range of 200~300° C. by additionally supplying steam of a low temperature of 200° C. or less (S5) when the reforming temperature is overheated to 300° C. or more during the reformation (S3). The regulation of the reforming temperature serves to increase the conversion rate of carbon monoxide into hydrogen.

Preferably, the syngas and the steam having passed through the respective preheaters have a temperature of 170~270° C. and are mixed with each other in a ratio of 1.5~3 ($CO/H_2O$).

Now, a test example of the present invention will be described.

Test Example

In this test, a gas reaction tank including a reaction chamber having a diameter of 30 mm and a height of 20 mm was used.

Syngas was supplied at a rate of 200 ml/min.

Syngas and steam were heated to a temperature of 250° C., and then injected into the upper part of the reaction tank. (The proper temperature in a water gas reaction was set to 250° C., which is used in the water gas reaction during a steam reforming process. Therefore, it was determined that external heating is carried out only at a temperature less than 250° C.

A mixture of 4 wt % cobalt (Co), 10 wt % Molybdenum (Mo), and 86 wt % silica alumina ($SiO_2$—$Al_2O_3$) was used as a catalyst.

Figure 8A:
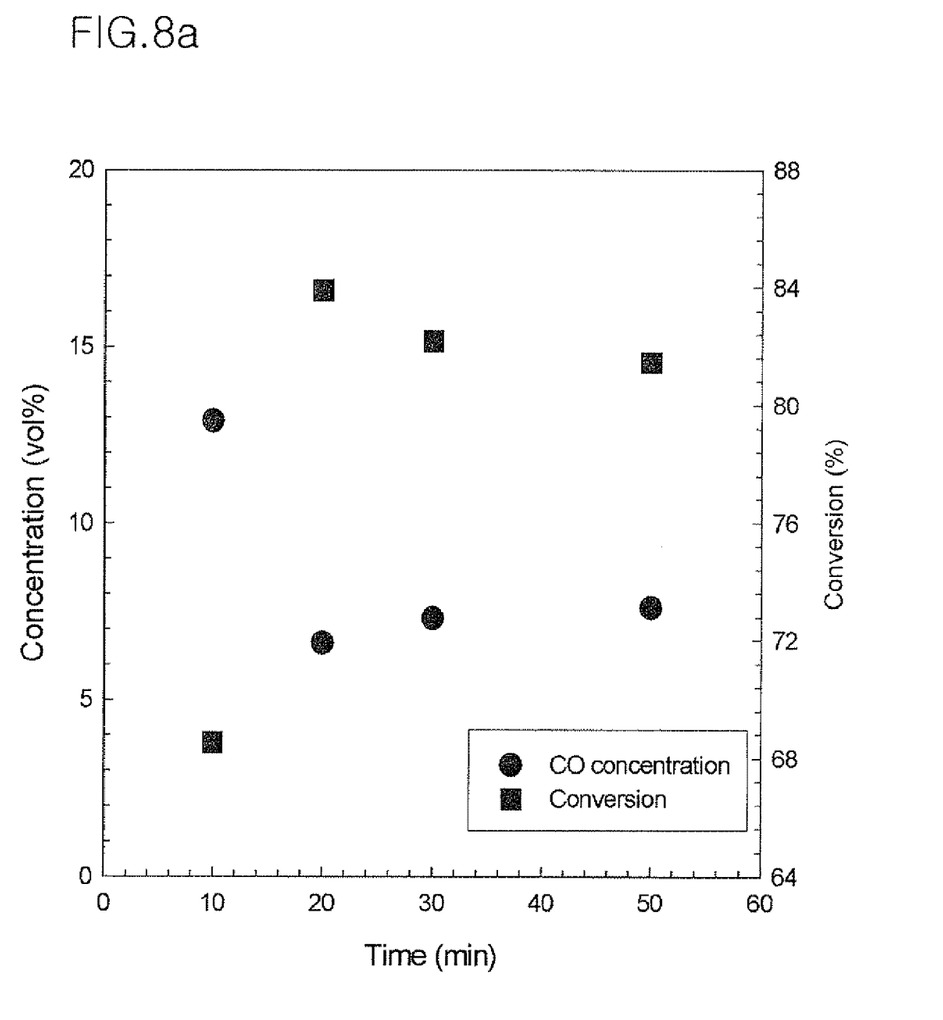
FIG. 8a is a graph illustrating measured data of conversion rates of CO concentration according to time using the water gas shift reactor in accordance with the present invention.
Figure 8B:
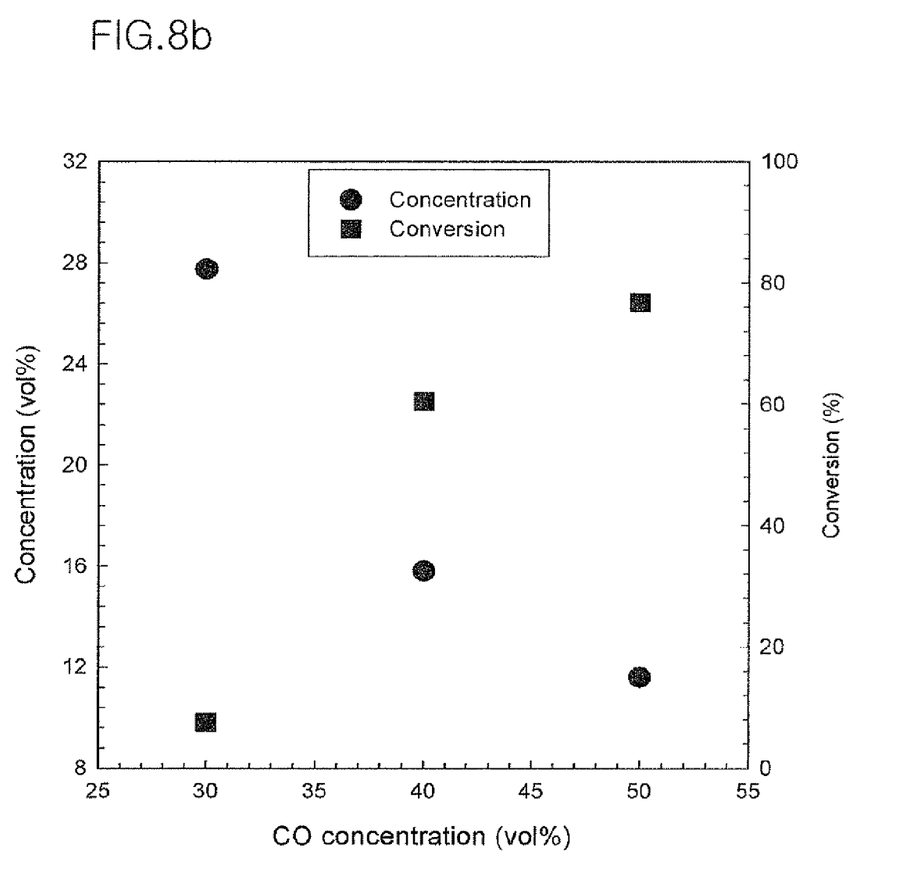
FIG. 8b is a graph illustrating measured data of conversion rates according to variation in CO concentration using the water gas shift reactor in accordance with the present invention.

The water gas reaction (reforming reaction) was tested under the above conditions. FIGS. 8a and 8b illustrate conversion rates of CO into hydrogen.

During a reaction time, the temperature of the catalyst layer was not varied, but the temperature of the gas discharged from the lower part of the reaction chamber was raised to 300° C. or more.

From FIG. 8a illustrating conversion rates of CO concentration according to time, it is appreciated that the CO concentration in the discharged gas is high in the initial stage, and reaches an equilibrium state (a conversion rate of about 80%) under the same conditions as time passed (about 10 minutes to 20 minutes).

With reference to FIG. 8b illustrating conversion rates according to variation in CO concentration, it is appreciated that the conversion rate is very low when the CO concentration is 30% and the conversion rate is increased as the CO concentration is increased to 40% and 50%.

Therefore, it is appreciated that as the CO concentration is increased, the conversion rate is increased, and the reaction time is about 10~20 minutes.

As apparent from the above description, the present invention provides a fixed and fluidized bed water gas shift reactor using syngas from waste gasification and a hydrogen production method using the same, in which hydrogen is produced by a reaction of carbon monoxide in the syngas, obtained by gasifying combustible waste, such as residues of scrapped cars, plastic waste, and living waste, through partial oxidation or thermal decomposition at a temperature of 1,300~1,700° C., with water to increase the proportion of hydrogen in the syngas.

That is, the syngas containing hydrogen, carbon monoxide, carbon dioxide, hydrogen sulfide, and hydrogen monoxide generated from gasification of combustible waste contains carbon monoxide at a concentration of 30~50%. The syngas and the steam are supplied upward from the lower part of a gas reaction tank to fluidize a catalyst, or are supplied downward from the upper part of the gas reaction tank to convert carbon monoxide into hydrogen on the catalyst, thereby increasing a hydrogen production rate.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fixed and fluidized bed water gas shift reactor using syngas, which converts carbon monoxide in the syngas, generated from gasification of combustible waste, into hydrogen, comprising:
    a gas reaction tank including a reaction chamber formed in the shape of a hollow body provided with a porous plate installed in a lower portion thereof to divide the inside of the reaction chamber into an upper reaction space and a lower collection space and a catalyst stacked on the upper surface of the porous plate to convert carbon monoxide into hydrogen, and an insulating layer provided at the outer surface of the reaction chamber to prevent heat in the reaction chamber from being discharged to the outside of the reaction chamber;
    a syngas storage tank to store the syngas obtained by the gasification of the combustible waste;
    a syngas supply pipe to supply the syngas to the gas reaction tank, after the syngas from the syngas storage tank is heated by a preheater;
    a steam supply pipe to supply steam generated from a steam generator to the gas reaction tank such that the steam reacts with the syngas, after the steam is heated by a preheater; and
    a reaction gas discharge pipe installed opposite to the syngas supply pipe to discharge reaction gas obtained by a reforming reaction in the gas reaction tank,
    wherein a temperature measuring unit is connected to each of the upper reaction space, a catalyst stack space, and the lower collection space of the gas reaction tank, and a steam injection pipe is connected to the side surface of the upper reaction space such that a reaction temperature in the gas reaction tank is regulated by supplying steam of a low temperature according to the temperature of the temperature sensing unit of each of the spaces through a controller.

2. The fixed and fluidized bed water gas shift reactor according to claim 1, wherein:
    the syngas supply pipe and the steam supply pipe are connected to the upper part of the gas reaction tank such that the syngas and the steam are supplied in the downward direction; and
    the reaction gas discharge pipe is connected to the lower collection space of the gas reaction tank such that the reaction gas is discharged to the outside of the gas reaction tank.

3. The fixed and fluidized bed water gas shift reactor according to claim 1, wherein:
    the syngas supply pipe and the steam supply pipe are connected to the lower collection space of the gas reaction tank such that the syngas and the steam are supplied in the upward direction; and
    the reaction gas discharge pipe is connected to the upper part of the gas reaction tank such that the reaction gas is discharged to the outside of the gas reaction tank.

4. The fixed and fluidized bed water gas shift reactor according to claim 1, wherein:
    upper and lower syngas supply pipes, upper and lower steam supply pipes, and upper and lower reaction gas discharge pipes are respectively provided and connected to the upper and lower parts of the gas reaction tank such that the syngas and the steam are supplied selectively in the upward and down directions; and
    the reaction gas is discharged through one of the upper and lower reaction gas discharge pipes in the opposite direction of the supply direction of the syngas.

5. The fixed and fluidized bed water gas shift reactor according to claim 2, wherein the steam generated from the steam generator is supplied to the preheater of the syngas supply pipe through a steam mixing pipe branched off from the steam supply pipe and is mixed with the syngas, and the mixture of the steam and the syngas is supplied to the gas reaction tank.

6. The fixed and fluidized bed water gas shift reactor according to claim 1, wherein porous plates, each of which is provided with a catalyst stacked thereon, are disposed in a two-stage structure such that a reaction by the catalyst is achieved in two layers.

7. The fixed and fluidized bed water gas shift reactor according to claim 1, wherein heaters are buried under the insulating layer of the gas reaction tank, and allow the reaction chamber to maintain a designated temperature.

8. The fixed and fluidized bed water gas shift reactor according to claim 3, wherein the steam generated from the steam generator is supplied to the preheater of the syngas supply pipe through a steam mixing pipe branched off from the steam supply pipe and is mixed with the syngas, and the mixture of the steam and the syngas is supplied to the gas reaction tank.

9. The fixed and fluidized bed water gas shift reactor according to claim 4, wherein the steam generated from the steam generator is supplied to the preheater of the syngas supply pipe through a steam mixing pipe branched off from the steam supply pipe and is mixed with the syngas, and the mixture of the steam and the syngas is supplied to the gas reaction tank.

* * * * *